May 16, 1939.  I. W. LIGON  2,158,704
MEASURING CUP
Filed July 13, 1937
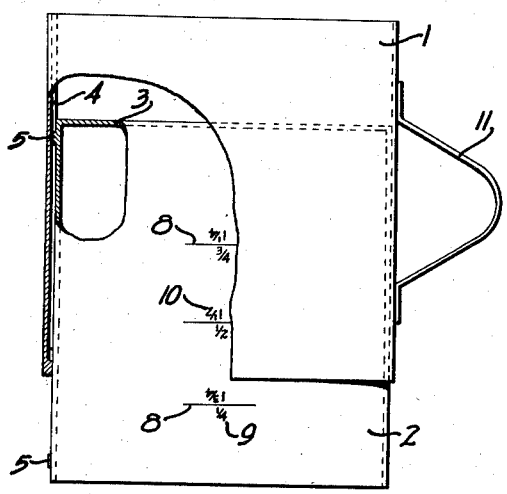
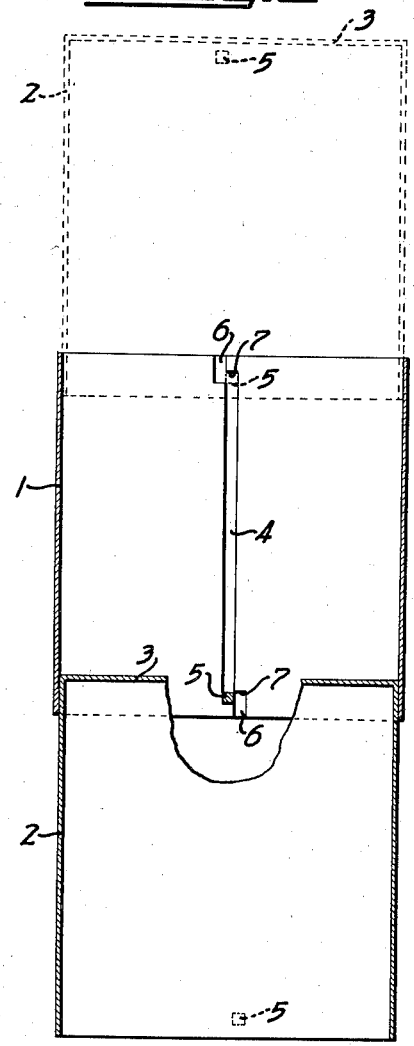
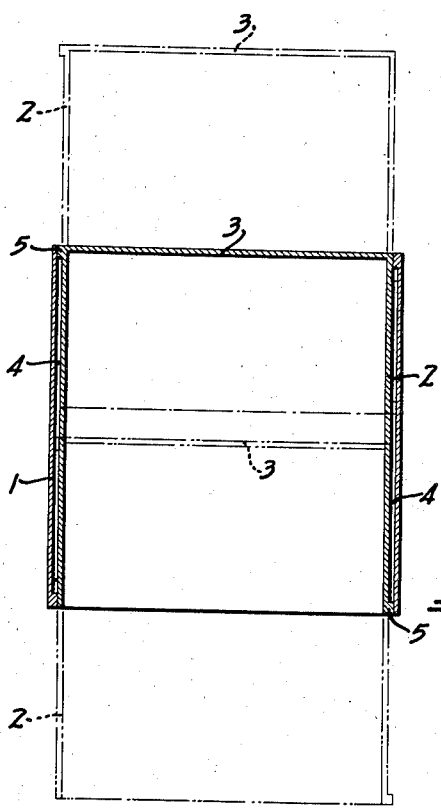
INVENTOR
IRA W. LIGON
BY Charles S. Evans
HIS ATTORNEY Patented May 16, 1939

2,158,704

UNITED STATES PATENT OFFICE 2,158,704

MEASURING CUP

Ira W. Ligon, Richmond, Calif.

Application July 13, 1937, Serial No. 153,350

4 Claims. (Cl. 73—165)

My invention relates to a cup for measuring selected amounts of materials.

It is among the objects of my invention to provide a cup wherein the bottom is movable relative to the walls for varying the capacity of the cup.

Another object is to provide a measuring cup structure which will facilitate the measuring of selected quantities of plastic materials, and by which the measured quantity may be readily expelled from the cup.

A further object is to provide a measuring cup having a capacity which is variable through a wide range.

Another object is to provide an adjustable measure having means for defining the ordinary limits of movement and at the same time permitting the parts to be separated for cleaning.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the drawing:

Figure 1 is a side elevation of the measuring cup of my invention, parts being broken away, and parts being shown in vertical section.

Figure 2 is a vertical mid-sectional view, the parts being shown in one extreme position in full lines and in the opposite extreme position in dotted lines.

Figure 3 illustrates a modified arrangement of the stops.

In terms of broad inclusion, the measuring cup of my invention comprises a shell, open at both ends, and provided with a bottom movable to various positions for varying the capacity of the measure. The bottom is carried by an inner shell telescoping with the outer shell, and permitting movement of the bottom to positions for measuring quantities up to double the capacity of the outer shell. Graduations are provided for indicating the capacity at various positions of the bottom. Preferably, means are provided for defining the extreme positions of the parts, said means being arranged to permit the parts to be entirely separated for cleaning when desired.

In terms of greater detail, the measuring cup of my invention comprises a shell 1, preferably cylindrical in form, and open at both ends. An inner shell 2 is mounted in telescoping relation with the outer shell. Preferably, the inner shell is of substantially the same length as the outer shell, and of a diameter such as to give a close sliding fit within the outer shell.

The inner shell 2 is provided with a bottom 3 closing one end, the inner and outer shells being axially movable relative to each other for positioning the bottom 3 in desired relation to the ends of the outer shell. When the shells are positioned with their corresponding ends substantially coinciding, the two will provide a measure open at only one end, and may be used in the manner of an ordinary measuring cup.

By moving the bottom 3 inwardly from the adjacent end of the outer shell 1, a measure is provided in the end of the outer shell having a capacity varying in accordance with the depth to which the bottom 3 is moved. In this manner, an appropriate positioning of the bottom will permit the measuring of any desired fractional part of the capacity of the outer shell, up to substantially its full capacity. At the same time the inner shell provides a measure open at the opposite end of the device. This second measure has the full capacity of the inner shell; and is available for measuring materials, in the manner of an ordinary measuring cup, regardless of the position to which the bottom 3 is moved within the outer shell. Either measure may be used as desired; and different materials may be separately measured in opposite ends of the measure without intermingling either material with a residue left in the other part of the measure.

By moving the inner shell 2 in the opposite direction, so that the bottom 3 is moved outwardly from the outer shell, the measure may be adjusted to obtain a capacity up to the combined capacity of the two shell portions.

Preferably, means are provided for defining the ordinary limit of movement of the inner shell, relative to the outer shell, so as to hinder an unintentional separation of the shells. For example, the outer shell 1 may be provided with a groove 4 arranged to receive stops 5 positioned at the ends of the inner shell 2. The groove 4 is formed with offset portions 6 adjacent the ends of the outer shell, to provide shoulders 7 against which the stops may engage.

The stops 5 are so positioned that when the inner and outer shells are fully telescoped, one stop will be positioned adjacent the shoulder 7 at one end of the groove, while the other stop will be positioned adjacent the shoulder 7 at the other end of the groove. From this position the shells may be relatively rotated sufficiently to cause the desired stop 5 to move into alinement with the groove 4. This permits the inner shell to be moved axially in the desired direction until the stop engages the shoulder 7 at the opposite end of the groove. When it is desired to entirely separate the shells for cleaning, or for any other purpose, the shells are further relatively rotated to move the stop into alinement with the offset portion 6, thereby permitting the inner shell to be entirely removed.

Instead of a single groove 4 with offset portions at each end, two grooves may be provided, one having an offset portion at one end and the other having an offset portion at the opposite end of the shell. Such an arrangement is illustrated in Figure 3 of the drawing. In this structure, each stop 5 may move freely into and out of one end of its groove, but engages the shoulder 7 when moved to the opposite end of the groove. As a result, the shells may be moved from one extreme position to the other without requiring any turning movement at any intermediate point. The inner shell may be entirely removed from either end of the outer shell by turning the shells relative to each other sufficiently to bring the obstructing stop into alinement with the offset portion 7 of its groove.

Graduations 8 are preferably provided for indicating fractional parts of the capacity of the measure. For example, graduations may be placed upon the inner shell for registering with the ends of the outer shell. Indices 9 may be provided adjacent the graduations to read in fractional parts of the capacity of the measure, as the inner shell is moved to recede the bottom into the outer shell. Other indices 10 may be provided to read as a unit, plus a fractional part of a unit, when the inner shell is moved to provide a measure having increased capacity. The indices 10 are inverted with respect to the indices 9, and hence the same graduations may be utilized for marking different capacities when moved to register with opposite ends of the outer shell.

The shells 1 and 2 may be made of any suitable material. For example, they may be economically made of sheet metal, the groove 7 being crimped or rolled into the outer shell during the forming process. In that case, the stops may be pressed from the wall of the inner shell. If desired, the shells may be molded from plastic material such as the phenolic condensation products.

Preferably the outer shell 1 is provided with a suitable handle 11, shaped to provide a convenient means for holding the measure with either end up.

The measure is especially useful for household use, particularly for measuring plastic or viscous substances such as shortening, molasses, and similar materials. In this connection, the bottom 3 is moved to a position providing the desired measure, and the portion of the outer shell above the bottom is filled with the substance to be measured. The material may be readily leveled off to give an exact measure, by scraping off any surplus with a knife. The inner shell may then be moved as a plunger to fully expel the material from the outer shell, thereby obtaining an accurately measured quantity of the material without waste.

I claim:

1. A measuring cup comprising an outer shell open at both ends, an inner shell slidably telescoping with the outer shell, a bottom closing one end of the inner shell and movable to selected position relative to the outer shell for producing a measure of desired capacity, the inner shell and closure being slidably movable in one direction to provide measures less than the capacity of the outer shell and in the opposite direction for providing measures greater than the capacity of the outer shell, and indicia upon the inner shell readable with respect to the ends of the outer shell for indicating the capacity of the measure at various positions of the inner shell.

2. A measuring cup comprising an outer shell open at both ends, an inner shell slidably telescoping with the outer shell and movable to project outwardly from either end of the outer shell to provide measures of greater or less capacity than the outer shell, a bottom closing one end of the inner shell and movable to selected position relative to the outer shell for producing a measure of desired capacity, graduations upon the inner shell arranged to register with an end of the outer shell for indicating the capacity of the measure at various positions of the inner shell, and indicia positioned upon opposite sides of the graduations, one of the indicia associated with a graduation being exposed and the other being concealed by the outer shell when the graduation is set to register with either end of the outer shell 3. A measuring cup comprising an outer shell open at both ends, an inner shell telescoping with the outer shell, a bottom sealing one end of the inner shell and movable to selected position relative to the outer shell for producing a measure of desired capacity, the inner shell and bottom providing a plunger movable for expelling measured amounts of plastic material from one end of the outer shell, and means for limiting movement of the inner shell relative to the outer shell while permitting removal of the inner shell from either end of the outer shell.

4. A measuring cup comprising an outer shell open at both ends, an inner shell telescoping with the outer shell, a bottom closing one end of the inner shell and movable to selected position relative to the outer shell for producing a measure of desired capacity, a groove in the wall of one of the shells having offset portions adjacent the ends thereof opening outwardly at the ends of the shell, stops upon the other shell for movement along the groove, the stops being movable into engagement with shoulders formed by the offset portions at the ends of the groove for defining extreme positions of the shells relative to each other and being movable along said offset portions for permitting separation of the shells.

IRA W. LIGON.